(12) United States Patent
Cameron

(10) Patent No.: US 6,185,063 B1
(45) Date of Patent: Feb. 6, 2001

(54) METHODS AND APPARATUS FOR OVERLAPPING DATA TRACKS ON A STORAGE MEDIUM

(75) Inventor: T. Jay Cameron, Corralitos, CA (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 08/999,017

(22) Filed: Dec. 29, 1997

Related U.S. Application Data

(60) Provisional application No. 60/038,362, filed on Feb. 13, 1997.

(51) Int. Cl.[7] ..................................................... G11B 5/596
(52) U.S. Cl. ............................................. 360/78.04; 360/75
(58) Field of Search ........................ 360/48, 75, 78.01, 360/78.04, 78.12, 78.13, 13, 57

(56) References Cited

U.S. PATENT DOCUMENTS

| | | | |
|---|---|---|---|
| 4,298,897 | * | 11/1981 | Arter et al. ............................ 360/39 |
| 5,047,873 | * | 9/1991 | Ballinger et al. .................. 360/70 X |
| 5,276,566 | * | 1/1994 | Clifford, Jr. ........................ 360/75 X |
| 5,293,281 | * | 3/1994 | Behr et al. ..................... 360/77.12 X |
| 5,828,511 | * | 10/1998 | Bar ................................ 360/78.02 X |

* cited by examiner

*Primary Examiner*—Andrew L. Sniezek
(74) *Attorney, Agent, or Firm*—Jonathan E. Olson; Shawn B. Dempster; Edward P. Heller, III

(57) ABSTRACT

A narrow read head and a wider write head are used to store and retrieve data from a storage medium, such as a magnetic disk or tape. The wider write head is selectively positioned to record overlapping data tracks. The read head is subsequently positioned to read the non-overlapping portions of the data tracks. In one format, a read seldom data block is recorded by sequentially recording a plurality of data tracks such that each subsequent data track partially overlaps a previously written data track. In another format, pairs of data tracks are recorded by side-by-side, wherein within each pair of data tracks there is an overlapping region. In either format, the narrower read head is positioned to read the non-overlapping portions of the data tracks. Consequently, the storage capacity of the storage medium is optimized to take advantage of the narrow read head.

8 Claims, 6 Drawing Sheets

METHODS AND APPARATUS FOR OVERLAPPING DATA TRACKS ON A STORAGE MEDIUM

RELATED APPLICATIONS

This application is related to and claims priority to provisional U.S. patent application Ser. No. 60/038,362, filed Feb. 13, 1997.

FIELD OF THE INVENTION

The present invention relates to data storage devices, and more particularly to methods and apparatus that provide for more efficient use of the recording space available on a storage medium and an increase in the data storage capability of a storage device.

BACKGROUND OF THE INVENTION

Data storage devices are commonly used in computer systems to store large amounts of data. Certain types of data storage devices, such as tape drives, are normally used to provide archival storage of large amounts of data. Other types of data storage devices, such as disk drives, are typically used in workstations, personal computers, laptops and mainframe computer systems to store large amounts of data that can be quickly stored and retrieved.

Each of these exemplary data storage devices, i.e., the tape drive and disk drive, utilizes a data storage medium on which information is stored in the form of data. The storage medium in a tape drive is typically a magnetic tape, and the storage device in a disk drive is typically a magnetic disk, although other types of drives use other types of disks (e.g., optical disks). A tape drive normally comprises a servoing system configured to move the tape past one or more transducers arranged to read/write data on the tape. A disk drive generally comprises at least one magnetic disk that is rotated about an axis by a spindle motor and positioned to be accessed by one or more transducers. The surfaces of both the tape and the disk are typically divided into a series of data tracks. The data tracks on a tape can take several different shapes, including, for example, helical, arcuate and linear shapes. The data tracks on a disk usually extend circumferentially, typically in a concentric pattern, around the disk. Each data track, on either a magnetic tape or magnetic disk, stores data in the form of magnetic transitions on a recordable surface of the tape/disk. For example, each transition can represent a bit of information.

It is expected that users of disk drives and tape drives will place ever greater demands on manufacturers with regard to the amount of data that can be stored on and retrieved from a data storage device. This is especially true for modern software programs, which include graphics and other data structures that dramatically increase the amount of data that needs to be accessed. In addition, the rapid growth and the use of servers on computer networks requires large storage capabilities to accommodate the data needs of a larger number of users on the network who utilize network based servers and/or shared resources.

In recent years, the trend has been to design and build data storage devices that are capable of supporting these increasing needs. For example, one trend has been to provide disks that can support more information (often in a more compact size), and that can be operated at higher rotational velocities to increase data read and write rates. One consequence, however, of these improvements is that the data density on the recordable surface of the disks/tapes and the associated speeds of the disks/tapes are approaching the perceivable limits of conventional transducers and associated circuitry to rapidly and accurately read/write the closely spaced, fast-moving magnetic transitions required by such storage devices.

By way of example, in order to meet the data reading requirements in a conventional disk drive, a magnetoresistive (MR) transducer is typically used. The MR transducer is coupled to an electronic read channel that implements signal processing techniques, such as partial response maximum likelihood (PRML) detection. The MR transducer is configured to sense the magnetic transitions on the disk drive, and to produce a corresponding change in electrical resistance as a function of a change in magnetic flux on the disk. The MR transducer is coupled to an electronic circuit, for example, a pre-amplifier that detects the resistance changes in the MR transducer and generates one or more corresponding electrical signals that vary in time as a function of the resistance. Thus, the typical pre-amplifier outputs a signal that corresponds to the data recorded as magnetic transitions on the disk surface. This signal is then supplied to the remaining portions of the read channel which essentially extract/interpret the data represented within the signal.

A write channel is basically the opposite of the read channel, in that an electrical signal representing data is provided to a write head which is configured to affect the magnetic flux on the recordable surface and record the data as transitions therein.

However, because of differences in fabrication and manufacturing processes, a typical write head is much larger (e.g., twice as large or larger) than a read head equipped with an MR transducer. By way of example, it is possible given current technology to manufacture a read head that is narrow enough to read 25,000 tracks per inch (TPI). Write heads narrow enough to write 25,000 TPI are not known to date.

Thus, there is a need for methods and apparatus that effectively take advantage of the higher TPI capability of a narrow read head while also using a significantly wider write head.

SUMMARY OF THE INVENTION

The present invention provides methods and apparatus that allow overlapping data tracks to be stored on a recordable surface of a storage medium. The methods and apparatus provide differing data track storage formats, each of which advantageously increases the track pitch to take advantage of a read transducer that is narrower than a corresponding write transducer. This is accomplished by selectively overlapping wide data tracks during a write operation, while leaving enough of each data track to be subsequently read by the narrower read transducer during a read operation.

In accordance with one aspect of the present invention, a "wide-write and narrow-read" method is provided for use in a disk drive having a write head and a narrower read head. The method includes writing a plurality of data tracks on an information storage disk with a write head, such that a subsequently written data track partially overlaps a previously written data track. The method then includes reading a non-overlapped portion of at least one of the plurality of data tracks with a read head.

In accordance with another aspect of the present invention, a method is provided for writing a plurality of tracks of data on, and reading the plurality of tracks of data from, a storage medium. The method includes writing a first track of data along a first path, the first track of data having an initial width, and writing a second track of data along a second path, the second track of data having the same initial width, as the first track of data. The second path substantially follows the same direction as the first path, however a portion of the second track overlaps a portion the first track of data. Consequently, there is provided a reduced first track of data having a reduced width that is narrower than the initial width. The method subsequently includes reading at least a portion of the reduced first track of data and at least a portion of the second track of data with a read transducer. In certain embodiments this method further includes writing a third track of data along a third path and a fourth track of data along a fourth path such that the third and fourth paths substantially follow the same direction of the second path, and a portion of the fourth track of data overwrites a portion the third track of data. As a result, a third track of data that has a reduced width is provided. However, even after writing the third track of data the second track of data still has an initial width. In certain embodiments, the storage medium is an information storage disk, while in other embodiments, the storage medium is an information storage tape.

The above stated needs are also met by an apparatus, in accordance with one aspect of the present invention, for use in a data storage device in writing data to a storage medium via a write transducer, and reading the data from the storage medium via a read transducer. The apparatus includes logic which is configured to respond to at least one control signal associated with an accessing operation by outputting a signal to an actuator that is arranged to position the write and read transducers with respect to the storage medium. For example, the signal for a write accessing operation causes the write transducer to write at least one subsequent data track over at least a portion of a previously written data track, and the signal for a read accessing operation causes the read transducer to read at least a portion of a remaining portion of a previously written data track.

The foregoing and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements in which.

DETAILED DESCRIPTION OF EXEMPLARY EMBODIMENTS

The methods and apparatus of the present invention take advantage of the current state of technology in which it is possible to manufacture a read head that is significantly narrower than with a corresponding write head. The methods and apparatus of the present invention are readily adaptable for use in otherwise conventional data storage devices. The methods and apparatus of the present invention are directed towards increasing the density of the data stored on a storage medium by selectively overlapping data tracks written by the wider write head such that the narrower read head can then read the portions of the data tracks that have not been overlapped by another data track.

While the methods and apparatus of the present invention are described, hereinafter, in accordance with certain exemplary embodiments that are directed towards a disk drive, it is intended that the same methods and apparatus are readily applicable to other types of data storage devices, such as, for example, tape drives, that have read and write heads of differing sizes.

Figure 1:
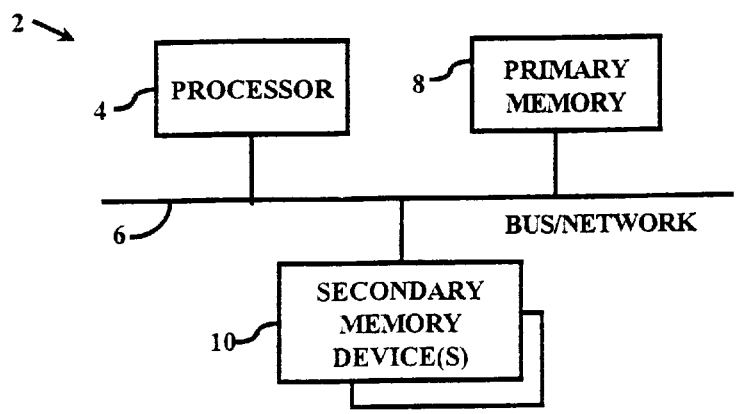
FIG. 1 is a block diagram depicting a computer system having a data storage device in the form of a secondary memory.

FIG. 1 is a block diagram of a conventional computer system 2 having a processor 4, a network or bus 6, a primary memory 8, and one or more secondary memory devices 10. Processor 4 is configured to implement computer instructions and process data, as is well known. The processor 4 accesses primary memory 8 and secondary memory devices 10 over bus 6. Primary memory 8 is typically a random access memory (RAM). Secondary memory devices 10 can include a tape drive, a hard disk drive, a floppy disk drive, an optical drive, and/or other like secondary memory storage devices. Those skilled in the art will recognize that other computer system configurations, for example, having additional buses, interfaces and peripheral devices, are also common.

Figure 2:
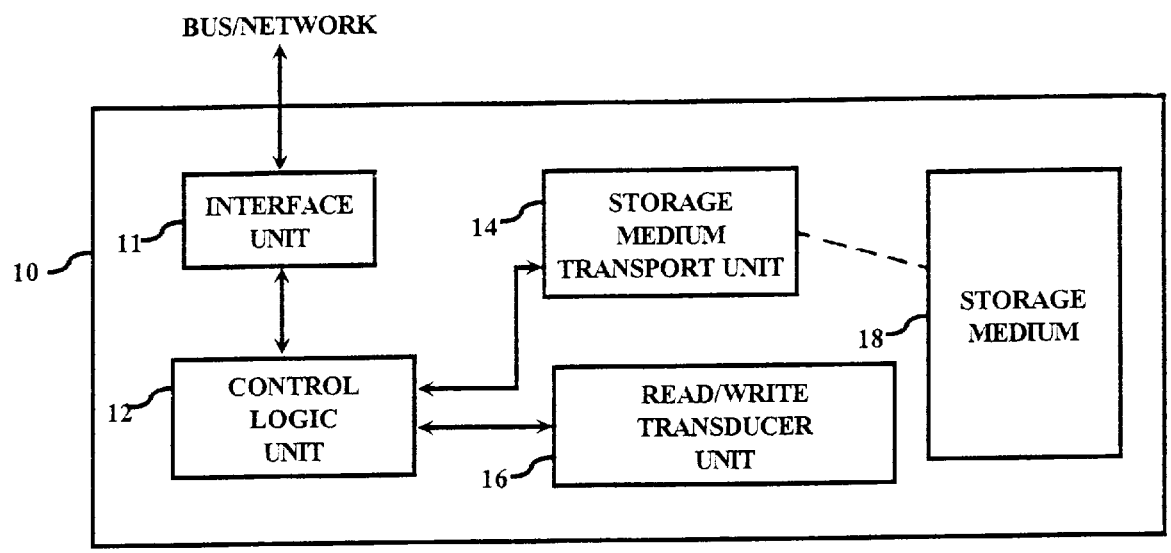
FIG. 2 is a block diagram depicting a conventional data storage device, as in FIG. 1.

FIG. 2 is a block diagram depicting an exemplary conventional secondary memory device 10, such as a tape or disk drive data storage device. Secondary memory device 10 includes an interface unit 11 for interfacing with bus 6, a control logic unit 12, a storage medium transport unit 14, a read/write transducer unit 16, and a storage medium 18. Control logic unit 12 is coupled to interface unit 11 and is configured to control the read and write operations conducted within secondary memory device 10 in response to one or more control signals received over bus 6. For example, processor 4 may assert a seek control signal over bus 6 that is received by interface unit 11. In one example, the seek control signal causes control logic unit 12 to seek and/or scan over a particular data track on storage medium 18 for use in a read and/or write operation.

Control logic unit 12 is coupled to storage medium transport unit 14 and configured to cause storage medium transport unit 14 to move or otherwise position storage medium 18 in a particular manner. For example, in a tape drive unit, storage medium transport unit 14 is responsible for moving the storage medium 18, in this case a magnetic tape, in accordance with control signals from control logic unit 12. In a disk drive unit, for example, storage medium transport unit 14 can include a motor controller circuit coupled to control a spindle motor that is configured to spin the storage medium 18, in this case one or more disks.

Control logic unit 12 is further coupled to read/write transducer unit 16 and configured to control the timing and positioning of one or more read/write transducers via the circuitry and mechanisms provided in read/write transducer unit 16. Read/write transducer unit 16 is arranged to read and write data from storage medium 18 in accordance with control signals received from control logic unit 12.

Figure 3:
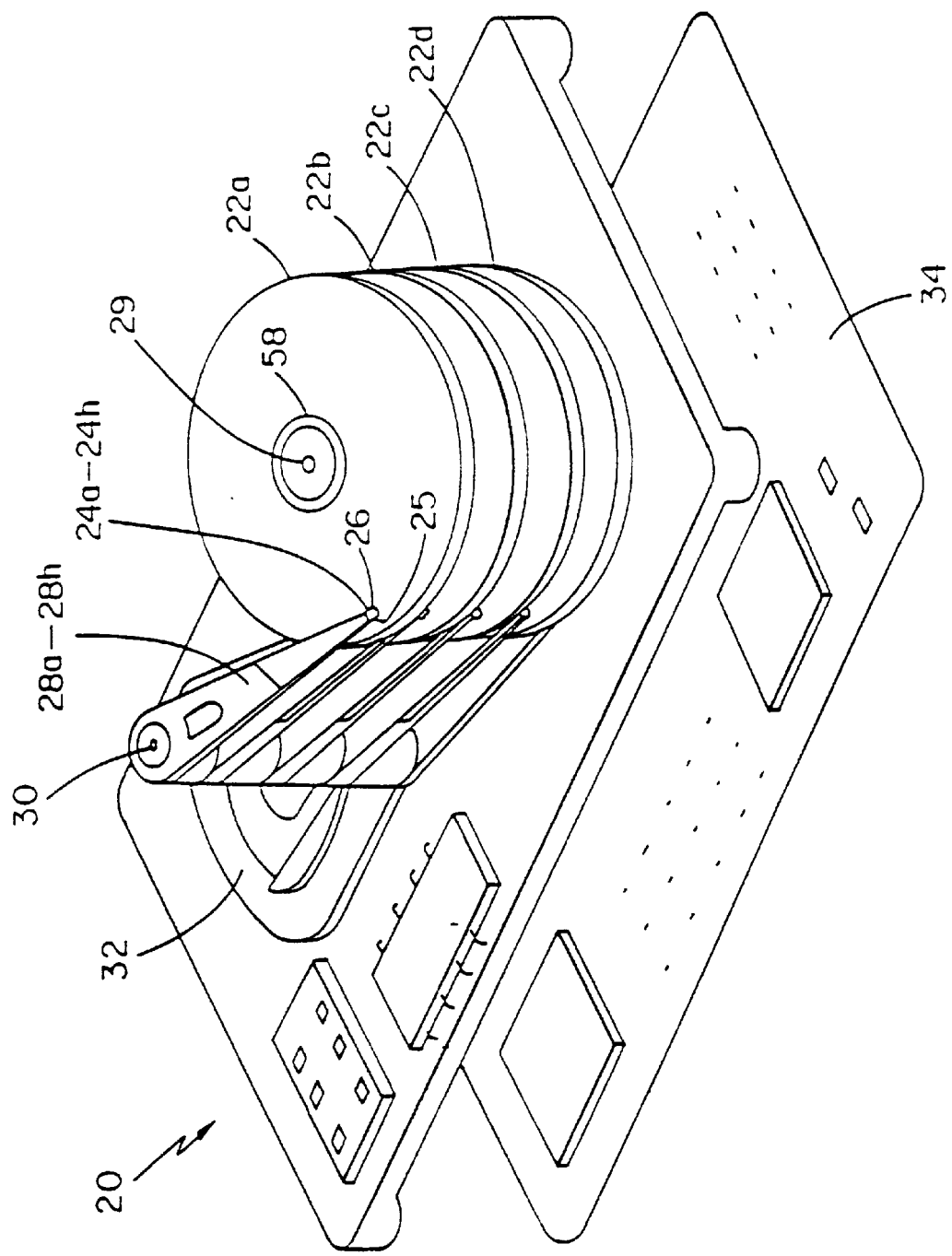
FIG. 3 depicts a perspective view of an exemplary disk drive.

FIG. 3 depicts an exemplary conventional disk drive 20 that is adaptable for use with the present invention. Disk drive 20 includes a plurality of storage disks 22a–d and a plurality of read/write heads 24a–h. Each of the storage disks 22a–d is capable of storing a plurality of data tracks. As illustrated in FIG. 3, a read/write head 24a–h is provided for each surface of each of the disks 22a–d such that data can be read from or written to the data tracks on storage disks 22a–d.

It should be understood that disk drive 20 is merely representative of a disk drive system that can be used in the present invention and that the present invention can also be implemented on a disk drive system including more or less storage disks, and/or additional elements.

Referring to FIG. 3, storage disks 22a–d are mounted for rotation by a spindle motor arrangement 29, as is known in the art. Additionally, read/write heads 24a–h are supported by respective actuator arms 28a–h for controlled positioning over pre-selected radii of the storage disks 22a–d to enable the reading/writing of data on the data tracks. Actuator arms 28a–h are rotatably mounted on a pin 30 and controlled by a voice coil motor 32 that is operable to controllably rotate actuator arms 28a–h radially across storage disks 22a–d.

Each of the read/write heads 24a–h is mounted to a respective actuator arm 28a–h and comprises a magnetic transducer structure 25 mounted to a slider 26. For high performance operation, magnetic transducer structure 25 typically includes a pair of transducers, including a narrow (magnetoresistive) MR transducer that serves as a read head, and a wider inductor that serves as a write head. In most conventional disk drive systems, sliders 26 cause magnetic transducer structures 25 of read/write heads 24a–h to "fly" above the surfaces of the respective storage disks 22a–d for non-contact operation of the disk drive system. When not in use, voice coil motor 32 rotates actuator arms 28a–h to position read/write heads 24a–h over a respective landing zone 60 (see FIGS. 4 and 5).

A printed circuit board (PCB) 34 is provided to mount control electronics for controlled operation of spindle motor 29 and voice coil motor 32. The PCB 34 also includes read/write channel electronics circuitry, which is coupled to the read/write heads 24a–h to control the transfer of data to and from the data tracks on storage disks 22a–d.

Figure 4:
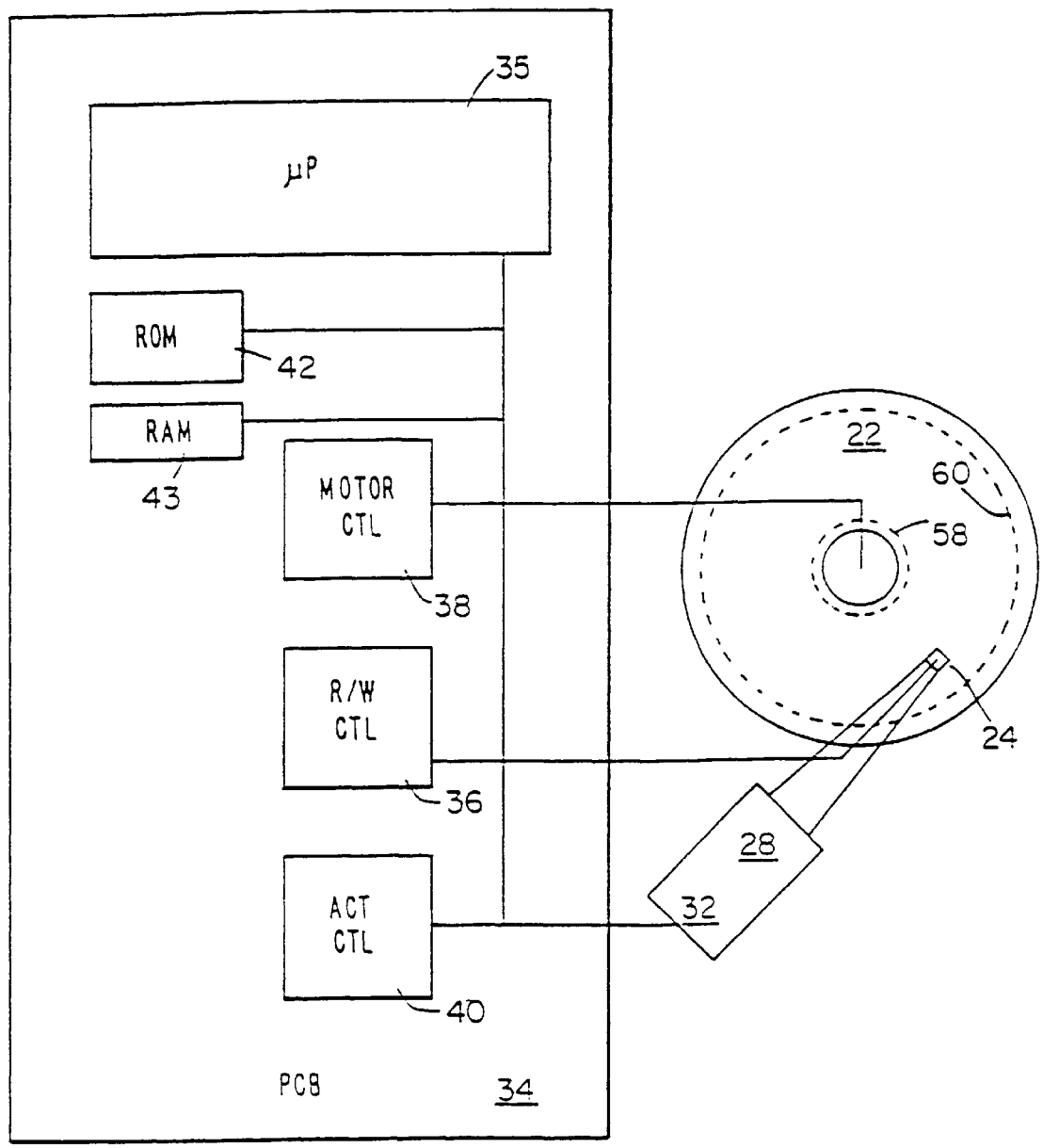
FIG. 4 depicts a top view of a printed circuit board of the disk drive of FIG. 3.

FIG. 4 is a block diagram illustrated in schematic form of an exemplary PCB 34 and the electrical couplings between the control electronics on PCB 34 and the components on the disk drive system described above. A microprocessor 35 is coupled to a read/write controller 36, a spindle motor controller 38, an actuator controller 40, ROM 32, and RAM 43. Microprocessor 35 sends data to, and receives data from, the storage disks 22a–d via read/write controller 36 and read/write heads 24a–h. Microprocessor 35 also operates according to instructions stored, for example, in ROM 42 to generate and transmit control signals to motor controller 38 and actuator controller 40. Motor controller 38 is responsive to the control signals received from microprocessor 35 to generate a drive voltage to spindle motor 29 (FIG. 3) to cause storage disks 22a–d to rotate.

Similarly, actuator control 40 is responsive to the control signals received from microprocessor 35 to generate a voltage to voice coil motor 32 to controllably rotate read/write heads 24a–h, via actuator arms 28a–h, to pre-selected radial positions over storage disks 22a–d. The magnitude and polarity of the voltage generated by actuator control 40, as a function of the microprocessor control signals, typically determines the radial direction and speed of read/write heads 24a–h.

Microprocessor 35 is configured to determine the current radial position of read/write heads 24a–h, and the radial position of the data track to where read/write heads 24a–h are to be moved. Once the new position is determined, microprocessor 35 implements a seek operation wherein the control signal generated by microprocessor 35 for actuator controller 40 causes voice coil motor 32 to move read/write heads 24a–h from the current data track to a destination data track at the desired radial position (e.g., sector).

Read/write controller 36 further includes a read channel that, for example, implements signal processing techniques such as partial response, maximum likelihood (PRML) detection to process the electrical signals output by the MR transducer in read/write heads 24a–h, during a read operation. Similarly, read/write controller 36 includes a write channel that supplies electrical signals to the write head in read/write heads 24a–h, during a write operation. As is known in the art, RAM 43 is typically used to buffer the data that is read from, or to be written to, storage disks 22a–d.

Figure 5:
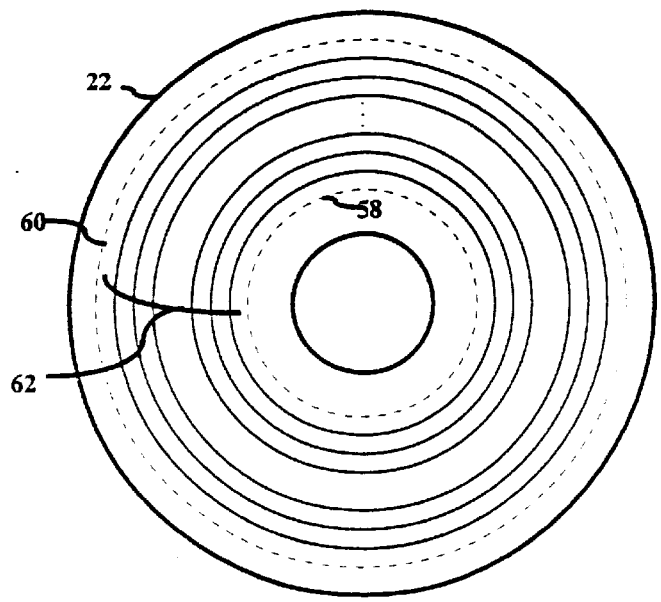
FIG. 5 depicts a top view of a disk as in FIGS. 2 and 3, having a plurality of data tracks recorded on a disk surface in a conventional manner.

FIG. 5 depicts an exemplary storage disk 22 for use in disk drive 20, for example, having at least one disk surface 23 that provides a recordable area upon which a plurality of data tracks 62 can be recorded. Associated with storage disk 22, there is an inside circumference 58 and an outside circumference (near landing zone 60). Between these points, as depicted in FIG. 5 with dashed lines, there is a recordable surface on which a plurality of data tracks 62 can be recorded and subsequently read.

Storage disk 22 can further be formatted in a number of ways, such that the data stored within particular data tracks is recoverable by referring to positional coordinates associated with the formatting of the storage disk 22. For example, storage disks 22a–d can be divided into a plurality of sectors and data tracks, as is well known. The positioning of read/write heads 24a–h above the recordable surface of storage disks 22a–d during a write operation and a subsequent read operation is dependent on the formatting of the plurality of data tracks 62.

The methods and apparatus of the present invention are directed towards increasing the density of the plurality of data tracks 62, or a subset thereof. There are at least two different formats, each of which are novel, for the recording of data tracks 62 that are supported by the methods and apparatus of the present invention. A first format is a "write seldom" format that maximizes the density of data tracks 62. A second format is a "paired" format that increases the density of data tracks 62 while also allowing for each of the data tracks to be written at any time. These formats are discussed in detail below, following a discussion of the controlling mechanisms that are used to align the read and write heads in accordance with one of these formats.

Figure 6:
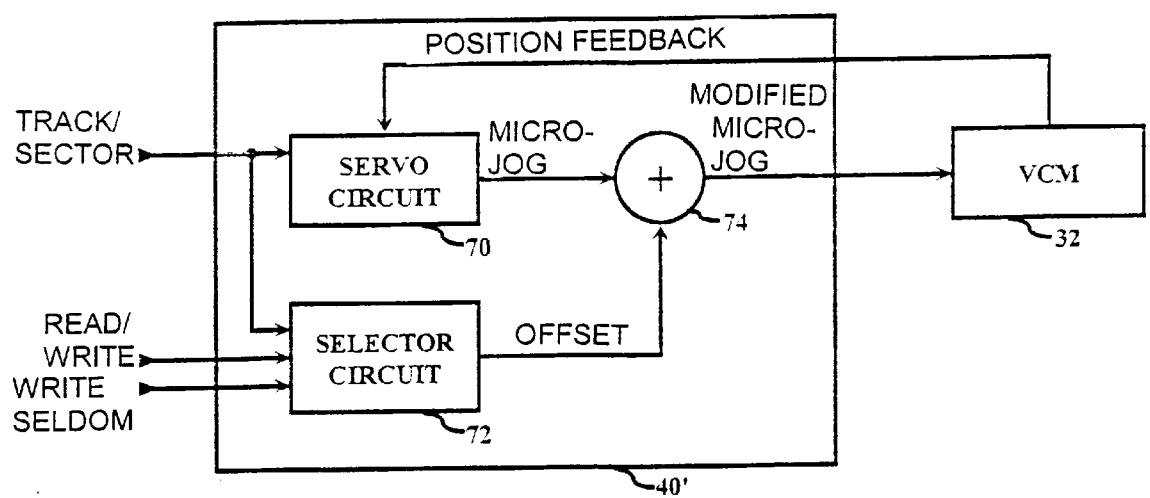
FIG. 6 is a block diagram depicting the control functions associated with a disk drive, in accordance with an embodiment of the present invention.

FIG. 6 is a block diagram that depicts an improved actuator controller 40' that, in accordance with an exemplary embodiment of the present invention, responds to a plurality of control signals (e.g., from microprocessor 35), and supplies a modified microjog control voltage signal to voice coil motor 32. This modified microjog control voltage signal modifies the positioning of read/write heads 24a–h during read and write operations to enable the formatting of the plurality of data tracks 62 in accordance with the various embodiments of the present invention.

Actuator controller 40' includes a servo circuit 70 that is coupled to receive conventional control signals from microprocessor 35. Servo circuit 70 also receives positional feedback information from voice coil motor 32, and/or other feedback devices configured to provide positional information with regard to the positioning of actuator arms 28*a*–*h*.

In accordance with an exemplary embodiment of the present invention, actuator controller 40' further includes a selector circuit 72 that is coupled to receive control signals from microprocessor 35. As shown, servo circuit 70 and selector circuit 72 each receives conventional track/sector signal(s) from microprocessor 35 during a read and/or a write operation. Selector circuit 72 is further configured to receive one or more control signals from microprocessor 35 that identify whether a read or write operation is occurring, and optionally if a "write seldom" block of data tracks is to be written. The write seldom format is discussed in detail below.

Because selector circuit 72 adjusts the positioning of read/write heads 24*a*–*h* in accordance with the formatting of the present invention, selector circuit 72 is configured to output an offset signal that is then added to the conventional microjog signal output by servo circuit 70. A conventional microjog signal is used to position the read/writes heads 24*a*–*h* to a particular track, based on a previous position. In certain embodiments of the present invention, the offset signal from selector circuit 72 is supplied to an adder 74, along with the microjog signal from servo circuit 70. Adder 74 is configured to combine the microjog signal and offset signal to produce a modified microjog control signal that is then applied to voltage coil motor 32. Because of the added offset, the positioning of read/write heads 24*a*–*h* will have been modified in accordance with one of the data track formats of the present invention.

FIGS. 7–10 depict exemplary data tracks that are recorded in accordance with the different formats of the present invention. Note that for ease of illustration, the data tracks depicted in FIGS. 7–10 are each depicted as being both straight and extraordinarily uniform. In an actual arrangement, the data tracks will typically not be this uniform and depending upon the type of storage medium and storage device configuration the data tracks will not necessarily be straight. For example, as depicted in FIGS. 3, 4, and 5, in a disk drive, the plurality of data tracks form concentric rings about a common axis.

Figure 7:
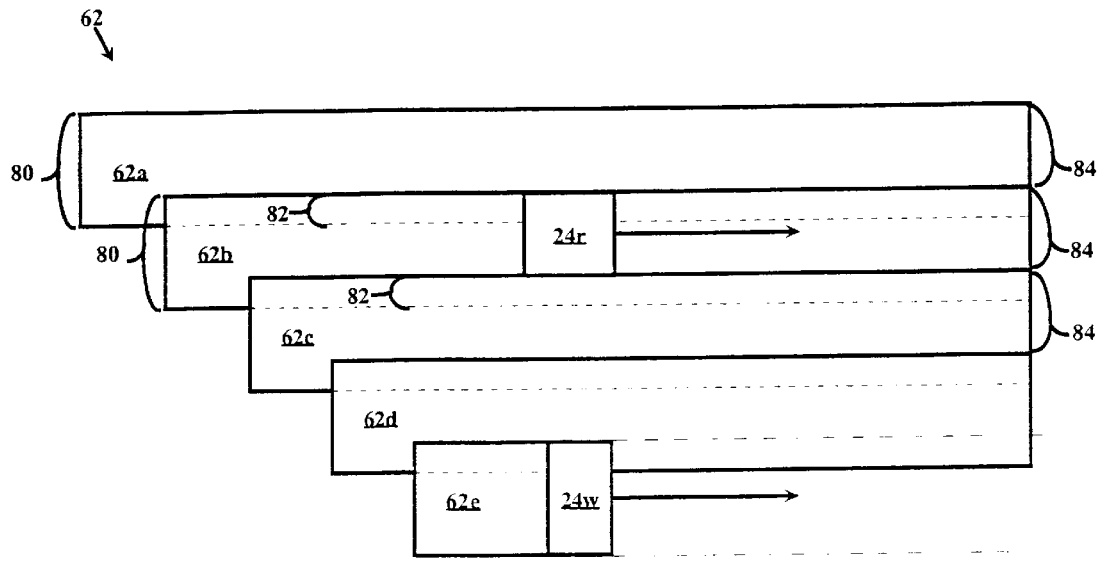
FIG. 7 depicts a plurality of data tracks recorded in a write seldom format in accordance with an exemplary embodiment of the present invention.

In FIG. 7, there is illustrated a plurality of data tracks 62, including data tracks 62*a*–*e*, which are recorded in a write seldom format. As shown, data tracks 62*a*–*e* are each partially overlapped by a subsequently recorded data track. In particular, data track 62*a* which has an initial width 80, as defined by the width of the write head 24*w*, has been partially overlapped by subsequently recorded data track 62*b*. Data track 62*b* also has initial width 80 because it was also written by write head 24*w*. Data track 62*b* has been partially overlapped by a portion of subsequently recorded data track 62*c*. Similarly, data track 62*c* is partially overlapped by subsequently recorded data track 62*d*. As shown, data track 62*e* is being recorded by write head 24*w* and is partially overlapping data track 62*d*. Each of the overlapped portions of data tracks 62*a*–*e* form an overlap region 82.

Write head 24*w*, in accordance with an exemplary embodiment of the present invention, is positioned in response to the modified microjog voltage signal from actuator control 40' to write data tracks 62*a*–*e* along specific paths (e.g., as depicted by the arrow leading away from write head 24*w*) in order to overlap the data tracks.

The plurality of data tracks 62 in FIG. 7 optimize the use of a write head 24*w* having a writing width that is substantially equal to initial width 80, and a read head 24*r* as depicted over data track 62*b* that has a narrow reading width that is less than the initial width 80.

Thus, as shown in FIG. 7, with this exemplary write seldom format there is a reduced width 84 within each of the plurality of data tracks 62 that is not overlapped by subsequent data tracks. Reduced width 84, therefore, represents the portion of each of the plurality of data tracks 62 wherein read head 24*r* can read the data, successfully, for the associated data track. For example, as depicted in FIG. 7, read head 24*r* is positioned to read the data recorded within the reduced width 84 of data track 62*b*. By applying the proper offset signal to adder 74 according to the present invention, the width of the resulting data tracks approaches the reading width of read head 24*r*. Thus, the write seldom format in FIG. 7 allows for a maximum track density that is based on the reading width of read head 24*r*.

In storage mediums having concentric data tracks, the write seldom format does not provide for selective re-recording of a data track within the plurality of data tracks 62. For example, to re-record data track 62*c*, it is necessary to write data tracks 62*c*, 62*d* and 62*e* over again and in sequence to avoid corrupting the data recorded in data track 62*d* while attempting to write track 62*c*. Thus, the write seldom format is useful for recording three or more data tracks when the data tracks are not required to be written over, or otherwise rewritten, very often. Hence, the name "write seldom" has been applied to such a format.

A write seldom formatted data block, such as that depicted in FIG. 7, may be advantageous for storing particular types of data. For example, an operating system or other application program having data that is mainly accessed only during read operations could be stored in this more compact write seldom format. Additionally, the write seldom format is also useful in the archival storage of data that does not require write access.

Figure 8:
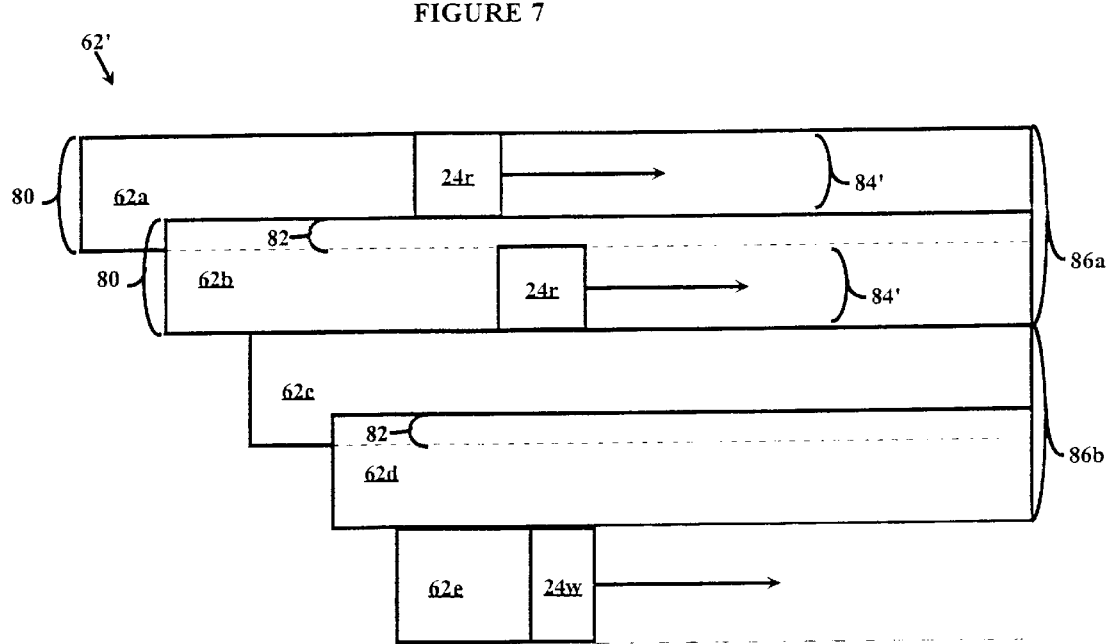
FIGS. 8 through 10 depict a plurality of data tracks recorded in a paired format in accordance with an exemplary embodiment of the present invention.

In accordance with still other exemplary embodiments of the present invention, a paired format that is provided for a plurality of data tracks 62' is depicted in FIG. 8. In a paired format, the data tracks 62' are recorded in one or more pairs, such as pairs 86*a* and 86*b*. The pairs 86*a* and 86*b* each have two data tracks that are partially overlapped. For example, data tracks 62*a* and 62*b* form pair 86*a*, and data tracks 62*c* and 62*d* form data track pair 86*b*. To store a large block of data a plurality of pairs, such as pairs 86*a* and 86*b* are used.

Unlike the write seldom format of FIG. 7, the paired format as depicted in FIG. 8 allows for individual data tracks, within each pair 86*a* and 86*b*, to be recorded or re-recorded at anytime without corrupting any of the other data tracks. Because there are no shared or overlapped regions between pairs 86*a* and 86*b* there is no need to rewrite or otherwise coordinate the writing of data to the data tracks in pairs 86*a* and 86*b*.

Figure 9:
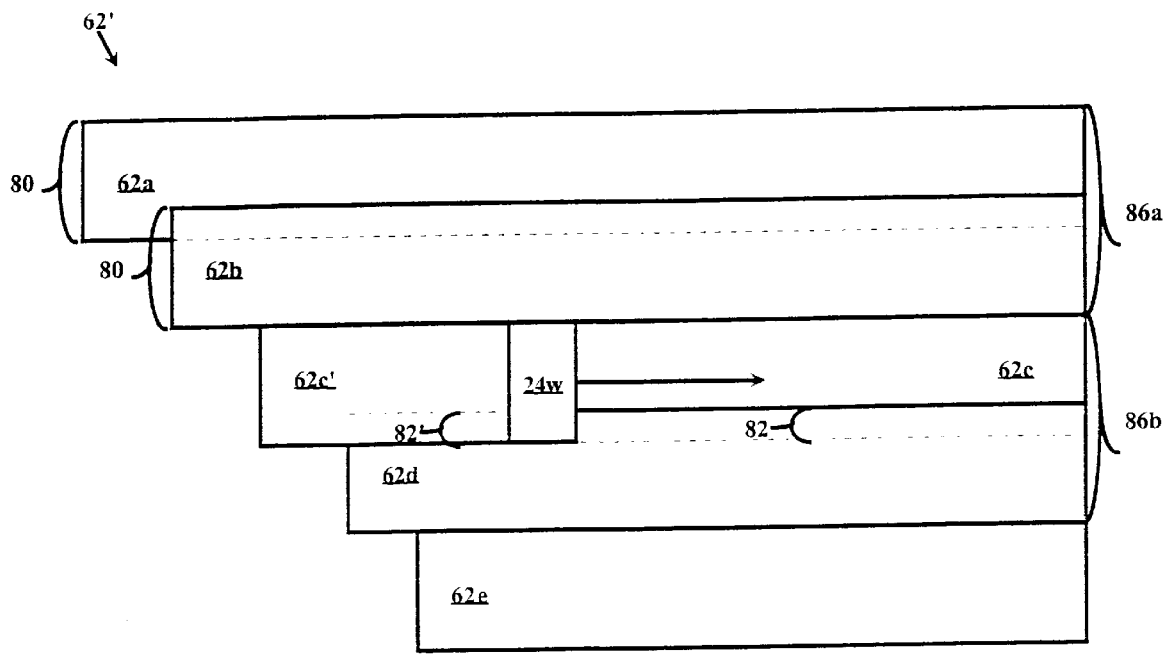

This feature of the paired format is illustrated in FIG. 9 wherein, for example, having previously written data track 62*a*–*e*, a subsequent write operation requires that data track 62*c* be re-recorded with new data. The rewriting of this data is depicted by write head 24*w* and new data track 62*c'*. As shown, a new data track 62*c'* is being recorded over data track 62*c* with write head 24*w*. Data track 62*c'* partially overlaps data track 62*d* as illustrated by overlap region 82'. Thus, by using a paired format, individual data tracks can be recorded during subsequent write operations without corrupting the other data tracks.

Within data track pair 86a, data track 62a is referred to as the "odd" track and data track 62b is referred to as the "even" track. The positioning of read head 24r to read either of data track 62a (odd) or data track 62b (even) is determined, for example, by selector circuit 72 in FIG. 6 based on the track/sector control signals from microprocessor 35. For example, in certain embodiments selector circuit 72 records or otherwise determines the proper offset signal for a particular data track based on the control signals from microprocessor 35. The proper offset signal is selected as a function of the format and of the odd or even reference for the data track within a data track pair.

Figure 10:
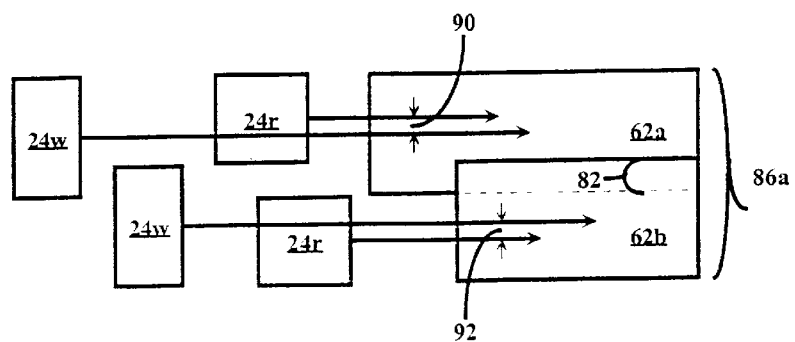

In FIG. 10, data track pair 86a is shown as having several tracking approaches or paths which are represented by directional arrows. These paths are determined by the modified microjog signal, which includes the offset signal for the selected format and data track. As shown in FIG. 10, data tracks 62a and 62b have been recorded by selectively positioning write head 24w on parallel paths such that data tracks 62a and 62b form an overlap region 82. During a subsequent read operation, read head 24r is properly positioned to read each of the data tracks 62a and 62b by applying an offset signal that causes read head 24r to scan over the targeted data track without passing over overlap region 82. Thus, for example, if the formatting is write seldom (as in FIG. 7) then read head 24r is positioned, via an offset signal, to read the data recorded within the reduced width 84 of data tracks. In a paired format, read head 24r is positioned, via an offset signal, to read the data recorded within the reduced width 84' of the targeted odd or even data track. For example, in pair 86a of FIG. 10 data track 62a is an odd track and data track 62b is an even track. Thus, in order to read the data recorded in data track 62a, the offset signal accounts for an odd track offset 90 to properly position read head 24r to read the data recorded in odd track 62a. In order to properly read an even data track, such as data track 62b, the offset signal accounts for an even offset 92 to properly position read head 24r over the reduced width 84' (see FIG. 8) of data track 62b. As such, in relationship to the alignment of write head 24w for each track, offsets 90 and 92 cause read head 24r to be repositioned in opposite directions. For example, in certain embodiments, odd offset 90 is essentially a negative offset value and even offset 92 is a positive offset value. Odd track offset 90 also provides the proper offset for use in a write seldom format because read head 24r is thereby properly aligned to read the data from the reduced width area 84 (see FIG. 7) of the track being scanned.

With the methods and apparatus of the present invention as described herein, it is possible to take advantage of the narrower read head technologies. By applying an offset signal for a particular format, the resulting track pitch is significantly increased over a standard implementation in which the track pitch is limited by the writing width of write head 24w. In the methods and apparatus of the present invention the track pitch is limited by the smallest of the heads which, in most cases, equates to the reading width of read head 24r. For example, if read head 24r is one-half the size of write head 24w then a 33% increase in the track pitch is provided in the paired format of FIG. 8, and a 100% increase in the track pitch is provided in the write seldom format of FIG. 7.

Although the present invention has been described and illustrated in detail, it is to the be clearly understood that the same is by way of illustration example only and is not be taken by way of limitation, the spirit and scope of the present invention being limited only by the terms of the appended claims.

What is claimed is:

1. A data storage device for writing and reading data, the data storage device comprising:

a storage medium;

an actuator configured to position the read and write transducers with respect to the storage medium, the actuator including read and write transducers configured to read and write the data on the storage medium;

logic operatively coupled to the read and write transducers, and configured to respond to at least one target position control signal associated with a read or write accessing operation by outputting a positioning signal suitable for use by the actuator, wherein the positioning signal associated with the write accessing operation causes the write transducer to write at least one subsequent data track over at least a portion of a previously written data track, and the positioning signal associated with the read accessing operation causes the read transducer to read at least a portion of a remaining portion of the previously written data track, the logic including:

a servo circuit configured to receive the at least one target position control signal and a position-indicative feedback signal from the actuator and output a raw positioning signal;

a selector circuit configured to receive the at least one target position control signal and output an offset signal as a function of the accessing operation; and a summing circuit coupled to the servo circuit and the selector circuit and configured to output the positioning signal as a function of the raw positioning signal and the offset signal.

2. The apparatus as recited in claim 1, wherein the selector signal is further configured to receive a select signal and output the offset signal as a function thereof.

3. The apparatus as recited in claim 1, in which the storage medium includes a rotatable disk.

4. The apparatus as recited in claim 1 configured to perform steps of:

(a) writing a first track of data along a first path, the first track of data having an initial width;

(b) writing a second track of data along a second path, the second track of data having the initial width, wherein the second path substantially follows a direction of the first path and a portion of the second track of data overlaps a portion the first track of data to produce a reduced first track of data having a reduced width that is narrower than the initial width; and (c) subsequently writing a new first track of data, having the initial width, substantially along the first path such that at least a portion of the first track of data is overwritten by the new first track of data, and wherein the new first track of data further overlaps a portion of the second track of data such that there is provided a reduced second track of data having a new reduced width that is narrower than the initial width.

5. The apparatus as recited in claim 4 in which the write transducer has a writing width that is substantially equal to the initial width.

6. The apparatus as recited in claim 4, further configured to perform a step of reading at least a portion of the second track of data.

7. The apparatus as recited in claim 4, further configured to perform a step of aligning the read transducer substantially within one of the non-overlapped portions.

8. The apparatus as recited in claim 4 in which the read transducer has a reading width that is narrower than the initial width.

* * * * *